(12) United States Patent
Fain et al.

(10) Patent No.: US 7,103,170 B2
(45) Date of Patent: *Sep. 5, 2006

(54) SYSTEM AND METHOD FOR PROVIDING A CALL BACK OPTION FOR CALLERS TO A CALL CENTER

(75) Inventors: Brian Fain, Alpharetta, GA (US); James C. Bedingfield, Liburn, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/095,010

(22) Filed: Mar. 31, 2005

(65) Prior Publication Data

US 2005/0232409 A1 Oct. 20, 2005

Related U.S. Application Data

(63) Continuation of application No. 09/894,359, filed on Jun. 28, 2001, now Pat. No. 6,879,683.

(51) Int. Cl.
*H04M 3/00* (2006.01)
*H04M 5/00* (2006.01)
*H04M 3/42* (2006.01)

(52) U.S. Cl. ............... 379/265.02; 379/210.01; 379/266.07

(58) Field of Classification Search ........... 379/265.02, 379/266.01, 209.01, 210.01, 265.09, 309, 379/266.07
See application file for complete search history.

(56) References Cited

U.S. PATENT DOCUMENTS

| 6,049,603 | A  | * | 4/2000 | Schwartz et al. | 379/309 |
| 6,574,329 | B1 | * | 6/2003 | Takeuchi et al. | 379/242 |
| 6,724,885 | B1 | * | 4/2004 | Deutsch et al.  | 379/265.02 |
| 6,847,712 | B1 | * | 1/2005 | Mashimo et al.  | 379/265.09 |
| 6,882,641 | B1 | * | 4/2005 | Gallick et al.  | 370/356 |

* cited by examiner

*Primary Examiner*—Benny Quoc Tieu
(74) *Attorney, Agent, or Firm*—Withers & Keys, LLC

(57) ABSTRACT

A system and method for providing a call back option to a customer of a call center. According to one embodiment, the system includes a telecommunications switch and an automatic call distributor in communication with the telecommunications switch via first and second communications links. The system also includes means for providing the customer with a call back option in response to a first call from the customer, wherein the first call is routed to the automatic call distributor by the telecommunications switch over the first communications link, and means for establishing a second call between the automatic call distributor and the customer over the second communications link when the customer accepts the call back option.

17 Claims, 7 Drawing Sheets

SYSTEM AND METHOD FOR PROVIDING A CALL BACK OPTION FOR CALLERS TO A CALL CENTER

This application is a continuation of application Ser. No. 09/894,359, filed on Jun. 28, 2001 now U.S. Pat. No. 6,879,683, and entitled SYSTEM AND METHOD FOR PROVIDING A CALL BACK OPTION FOR CALLERS TO A CALL CENTER.

BACKGROUND OF INVENTION

1. Field of Invention

The present invention relates generally to telecommunications and, more particularly, to systems and methods for providing a call back option to callers of a call center.

2. Description of the Background

A conventional call center is a central place where customer and other telephone calls are handled by an organization, usually with some amount of computer automation. Typically, a call center has the ability to handle a considerable volume of calls at the same time, to screen calls and forward them to someone qualified to handle them (agents), and to log calls. Call centers are used by mail-order catalog organizations, telemarketing companies, computer product help desks, and any large organization that uses the telephone to sell or service products and services.

Conventional call centers typically include an automatic call distributor (ACD) for distributing incoming calls to the call center to available and suitable agents for the purpose of addressing the caller's needs. Often the organization disseminates a single directory number associated for the call center. As customer calls are directed to the call center by the telephone network, the ACD ordinarily directs the calls to the agents based upon some algorithm, typically based on availability. When no suitable agents are available, the calls are routed to queues where the caller waits for the next suitable and available agent.

The resources, however, of conventional ACDs and call centers are not unlimited. As a result, customers calling during periods of high call volume for the call center often have to wait, in their opinion, for unacceptably long period of times to be connected to an agent. Customers obviously do not appreciate this because it is perceived as a waste of their time. Moreover, call centers do not appreciate this because their customers become frustrated and because it ties up their phone lines. Furthermore, if the call waiting queues reach capacity, customers are simply unable to reach the call center, and the call center has no way of determining how many calls it lost because of the overloaded condition.

Accordingly, there exists a need for a manner in which callers to a call center may be serviced without wasting the caller's time and without usurping the resources of the call center.

BRIEF SUMMARY OF THE INVENTION

The present invention is directed to a system and method for providing a call back option to a customer of a call center. According to one embodiment, the system includes a telecommunications switch and an automatic call distributor (ACD) in communication with the telecommunications switch via first and second communications links. The system further includes means for providing the customer with a call back option in response to a first call from the customer, wherein the first call is routed to the ACD by the telecommunications switch over the first communications link. In addition, the system includes means for establishing a second call between the ACD and the customer over the second communications link when the customer accepts the call back option. The first and second communications links may be, for example, trunk circuits between the telecommunications switch and the ACD of the call center.

The call back option may be, for example, a customer call back option or a call center call back option. According to one embodiment of the customer call back option, the system provides the customer with the option of calling the call center back during a specified time period, at which time the customer's call will be connected to the next available agent. The return call is routed to the call center over the second communications link, thus effectively bypassing the call waiting queues of the call center associated with the first communications link. According to one embodiment of the call center call back option, the call center may place a call to the customer over the second communications link during the specified time period.

According to one embodiment, the system may determine whether the call center is experiencing a high call volume based on statistical call center traffic pattern data. For example, it may be determined that the call center normally experiences excessive call traffic during certain time periods of certain days. If the customer calls during one of those time periods, the system may assume that the call center is therefore busy, and establish the return call during a time period during which the call center does not normally experience excessive call traffic. According to another embodiment, the call center may send an indication as to the current status of the call center: For example, an agent of the call center may send a message, via, for example, a TCP/IP network, that the call center currently is or is not experiencing excessive call volume.

According to one embodiment, the system may include a call back service platform in communication with the ACD. According to such an embodiment, the call back service platform may provide the customer with an option of having the call center call back the customer during a specified time period, determine whether the customer accepted the call back option, and establish the second call during the specified time period when it is determined that the customer accepted the call back option.

According to another embodiment, the present invention may be implemented with the Advanced Intelligent Network (AIN) of the public switched telephone network (PSTN). According to such an embodiment, the system includes the telecommunications switch, a service control point in communications with the switch, and an intelligent peripheral in communication with the switch. The telecommunications switch is for detecting a first call from the customer to the call center. The service control point is for determining whether, in response to detection of the first call by the telecommunications switch, the call center is busy. The intelligent peripheral is for receiving the first call when it is determined by the service control point that the call center is busy and, in response thereto, for providing the customer with a call back option and for determining whether the customer accepted the call back option. The telecommunications switch is further for routing the first call to the call center over a first communications link when it is determined by the service control point that the call center is not busy. The service control point is further for establishing a second call between the customer and the call center over a second communications link between the telecommunications switch and the call center when it is determined that the customer accepted the call back option.

The present invention is also directed to a method for providing a call back option to a customer of a call center. According to one embodiment, the method includes routing a first call from the customer to the call center over a first communications link, providing the customer with a call back option in response to the first call from the customer to the call center, and establishing a second call between the call center and the customer over a second communications link when the customer accepts the call back option.

Accordingly, the present invention provides a manner in which call center customers may be efficiently serviced without wasting the customers' time and the call center's resources. These and other benefits of the present invention will be apparent from the detailed description hereinbelow.

BRIEF DESCRIPTION OF THE FIGURES

The present invention is described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller" or "customer." In some cases, the calling party may not be a person, but may be a device such as a facsimile machine, an answering service, a modem, etc. The term "communication" is used herein to include all messages or calls that may be exchanged between a calling party and a called party, including voice, data and video messages. The term "communication" is used synonymously herein with the term "call" unless a distinction is noted.

Figure 1:
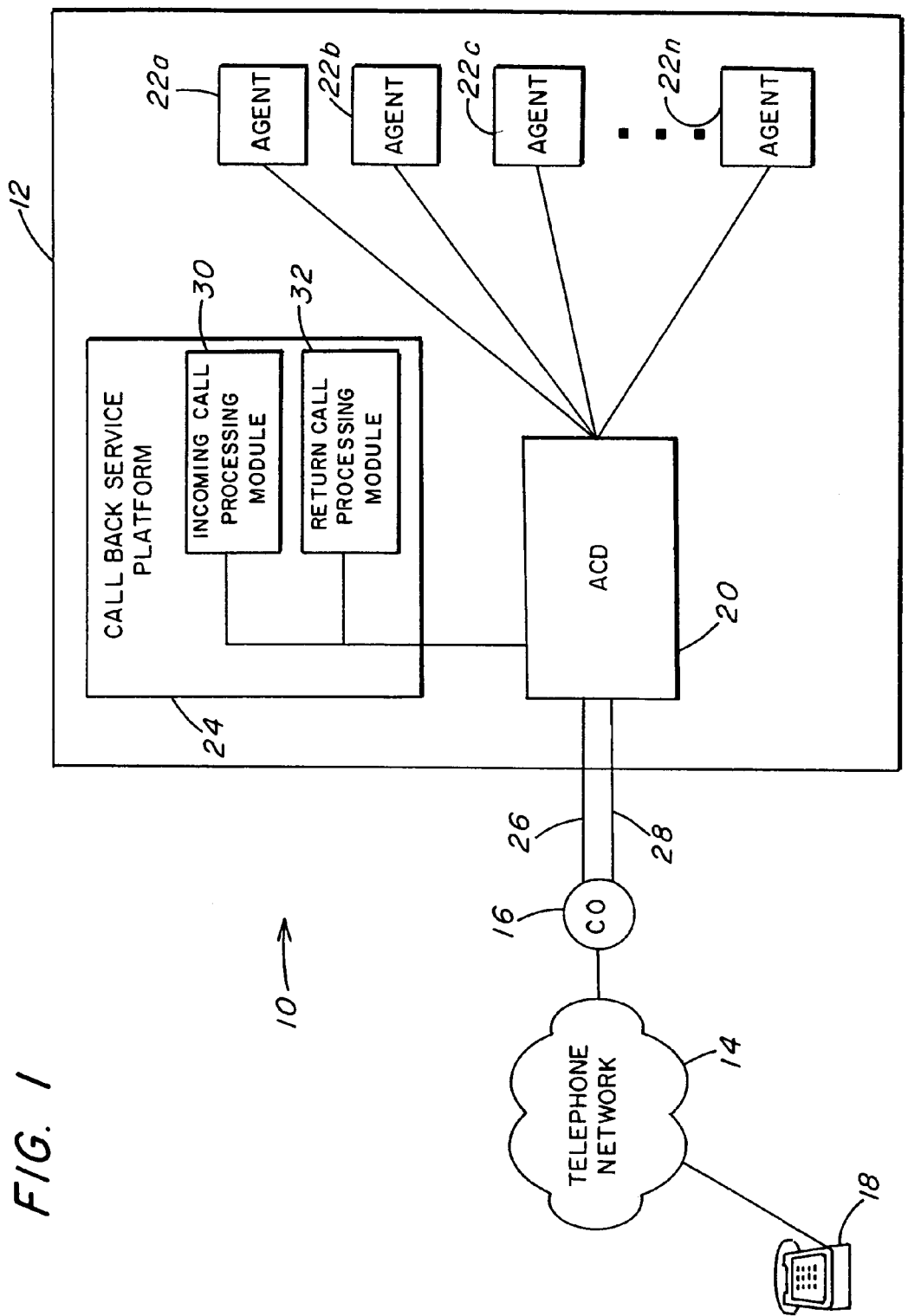
FIG. 1 is a diagram of a system according to one embodiment of the present invention.

FIG. 1 is a diagram of a system 10 according to one embodiment of the present invention. The system 10 includes a call center 12 in communication with a telephone network 14, such as the public switched telephone network (PSTN) and/or a wireless network, via a central office (CO) switch 16. The call center 12 may be used, for example, to provide services to a user of the telecommunications unit 18, i.e., a customer of the call center 12. In FIG. 1, the telecommunications unit 18 is illustrated as a landline telephone, however, the call center 12 may be used to provide services to users of other telecommunications units in communication with the call center 12 via the telephone network 14 such as, for example, a wireless telephone, a personal digital assistant (PDA), or a computer.

As illustrated in FIG. 1, the call center 12 may include an automatic call distributor (ACD) 20, a number of agent terminals 22a–n, and a call back service platform (CBSP) 24. The ACD 20 may be in communication with the CO switch 16 via a first communications link 26 and a second communications link 28. The communications links 26, 28 may be, for example, trunk groups such as, for example, T-1 trunk circuits.

The ACD 20 may include a multiport switch (not shown) and a central processing unit (CPU) (not shown). Each of the agent terminals 22a–n is in communication with the multiport switch and, under control of the CPU, the multiport switch may route incoming calls, such as from the telecommunications unit 18, to an available agent at one of the agent terminals 22a–n. If, as often happens, the call center 12 is overloaded with incoming calls such that no suitable agents are available to handle calls at the moment they come in, the calls may be placed in different queues based upon a pre-established criteria. In the queues, the calls await suitable agents becoming free and available to service the call. The waiting calls may be distributed to agents for handling on an oldest-call-waiting (OCW) basis. According to such a framework, the call center 12 may be used to provide call centers services to a caller, such as from the telecommunications unit 18.

The CBSP 24 may be utilized to provide call back services for a calling party to the call center 12. According to one embodiment, as described further hereinbelow, when a customer calls the call center 12 at a busy time for the call center 12, the CBSP 24 may place an outgoing call to the customer at a time when the call center 12 is experiencing low volume traffic, for example, thereby allowing the call center 12 to service the customer within an appropriate time period. This is referred to hereinafter as the "call center call back option." According to another embodiment, the CBSP 24 may provide the customer a more appropriate time to call the call center 12, thus also allowing the call center 12 to service the customer within an appropriate time period. This is referred to hereinafter as the "customer call back option." Both the "call center call back option" and the "customer call back option" are collectively referred to herein as a "call back option."

The CBSP 24 may be implemented as an intelligent platform such as, for example, a computer or a services node, and may be in communication with the ACD 20 via a LAN, for example. For an embodiment in which the CBSP 24 is a computer, the CBSP 24 may be, for example, a personal computer (PC), a workstation, or a server. For an embodiment in which the CBSP 24 is a services node, the CBSP 24 may be, for example, a Compact Services Node (CSN) available from Lucent Technologies Inc., Murray Hill, N.J.

As illustrated in FIG. 1, the CBSP 24 may include an incoming call processing module 30 and a return call processing module 32. The modules 30, 32 may be implemented as software code to be executed by the CBSP 24 using any type of computer instruction type suitable such as, for example, microcode, and may be stored in, for example, an electrically erasable programmable read only memory (EEPROM), or can be configured into the logic of the CBSP 24. According to another embodiment, the modules 30, 32 may be implemented as software code to be executed by the CBSP 24 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Figure 2:
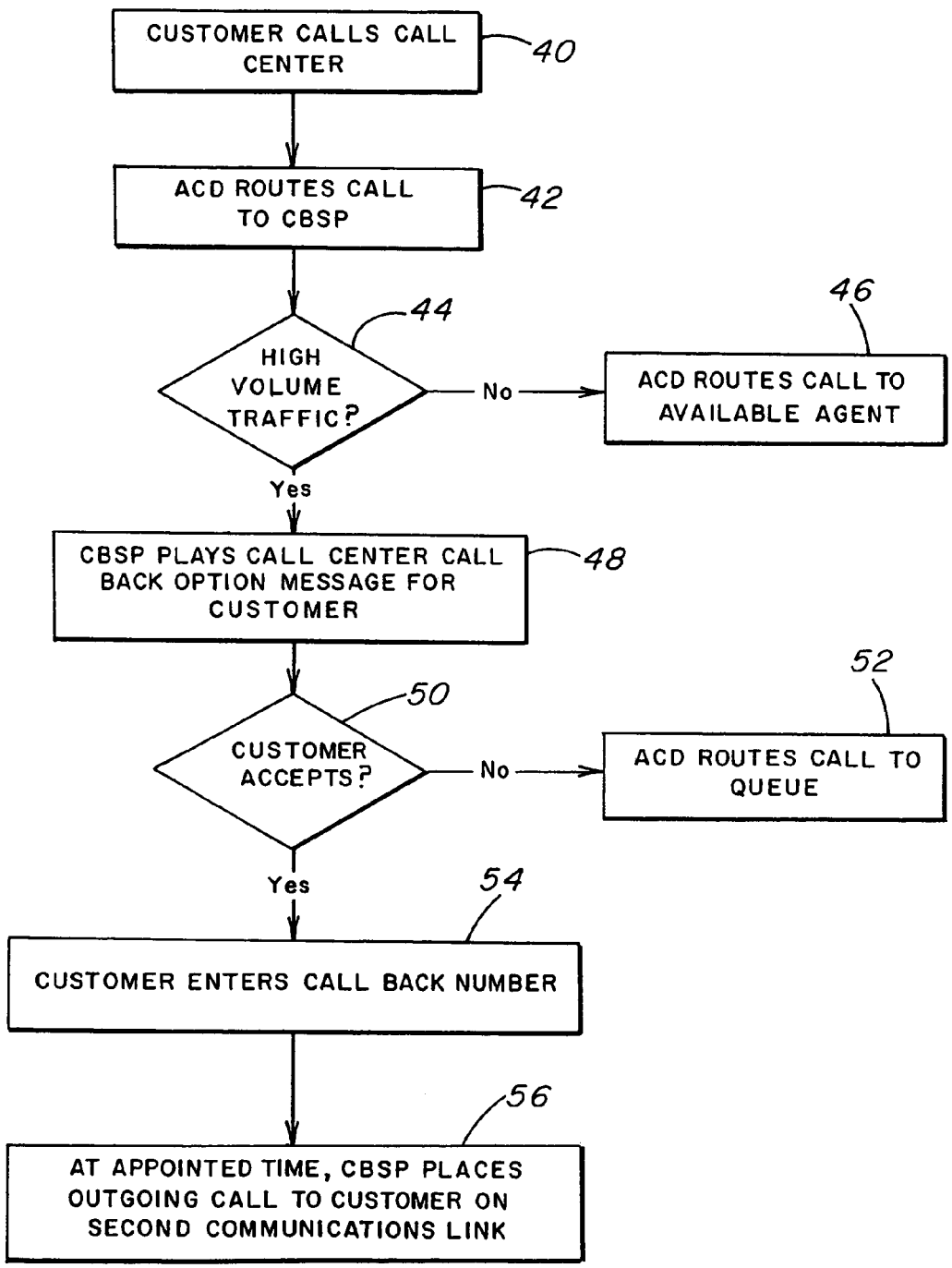
FIG. 2 is a diagram illustrating a process flow through the system of FIG. 1 according to one embodiment of the present invention.

FIG. 2 is a diagram of the process flow through the CBSP 24 for the call center call back option according to one embodiment of the present invention. The process initiates at block 40 where a customer, such as a user of the telecommunications unit 18, places a call to the call center 12. The customer may place the call to the call center 12 using a publicly published directory number associated with the call center 12. The CO switch 16 may detect this directory number, and route the call to the call center 12 over the first communications link 24.

From block 40 the process advances to block 42, where the ACD 20 routes the incoming call to the CBSP 24. At block 44, the incoming call processing module 30 of the CBSP 24 determines if the call center 12 is experiencing high volume traffic. According to one embodiment, the incoming call processing module 30 may make this determination by accessing a traffic pattern database. For example, the database may include a table listing certain time periods and whether the call center 12 typically experiences heavy call volume during that time period. Heavy call volume may be determined as times when incoming callers, on average, are required to wait a predetermined threshold time period in a queue before being connected to an agent.

If the call from the customer is received during one of those time periods, the incoming call processing module 30 may determine that the call center 12 is experiencing high volume traffic. Otherwise, the incoming call processing module 30 may determine that the call center is not experiencing high volume traffic. For example, the table may specify that the call center 12 experiences heavy volume traffic between 8 am and 5 pm, Monday through Friday. Thus, for calls received during these time periods, the incoming call processing module 30 may determine that the call center 12 is experiencing high volume traffic. According to another embodiment, the ACD 20 or an agent at one of the agent terminals 22a–n may communicate a message to the incoming call processing module 30 of the CBSP 24 is experiencing high volume traffic.

If at block 44 it is determined that the call center 12 is not experiencing heavy volume traffic, the process advances to block 46 where the incoming call processing module 30 may instruct the ACD 20 to route the incoming call to an available agent. If an agent is not currently available, the ACD 20 may route the call to a queue.

Conversely, if at block 44 the incoming call processing module 30 determines that the call center 12 is experiencing high volume traffic, the process advances to block 48 where the incoming call processing module 30 may play a message for the customer corresponding to the call center call back option. The message may prompt the customer to instruct the call center 12 as to how to process the call. For example, the incoming call processing module 30 may play a message such as: "We are currently experiencing higher than normal caller activity. If you would like to continue to wait for an operator, please press or speak 'one'. If you would like for us to call you back between [a specified time period], please press or speak 'two'."

The incoming call processing module 30 may determine the specified time period for a return call based on the call center traffic patterns. For example, the incoming call processing module 30 may select an upcoming time period in which the call center 12 typically does not experience high volume traffic, such as after 5 pm for the example mentioned previously. The time period may be any practicable length such as, for example, several minutes to several hours. The incoming call processing module 30 may play the message using, for example, a recorded voice file or a text-to-speech (TTS) DSP board.

From block 48 the process advances to block 50 where the incoming call processing module 30 determines if the customer accepts the call back option (i.e., the second option in the previously mentioned exemplary message). The incoming call processing module 30 may detect the customer's response using, for example, a DTMF (dual tone multi-frequency) decoder or an automatic speech recognition (ASR) software package.

If the customer does not accept the call back option, the process advances to block 52 where the ACD 20 routes the call to a queue. Alternatively, if the customer accepts the call back option, the process advances to block 54 where the customer informs the incoming call processing module 30 of the appropriate telephone directory number at which the call center 12 is to place the return call to the customer. For example, the incoming call processing module 30 may play a message for the customer such as: "If you wish that we call you back on the phone by which you are placing this call, please press or speak 'one'. If you wish that we call you back at a different number, please press or speak 'two', and then enter the number using the keys on your phone."

The incoming call processing module 30 may determine the customer's response using, as discussed previously, a DTMF decoder or an ASR software package. According to another embodiment, the incoming call processing module 30 may also allow the customer to speak the new directory number to which the call center 12 is to place the return call.

From block 54 the process advances to block 56 where, during the specified time period, the return call processing module 32 instructs the ACD 20 to place an outgoing call to the customer at the customer-specified directory number. The return call processing module 32 may determine the appropriate time for the outgoing call based on, for example, a timer set for the difference between the time that the customer initially called the call center 12 and the start of the specified time period. When the timer expires, the return call processing module 32 may instruct the ACD 20 to place the call to the customer. The call from the ACD 20 may be placed to the customer over the second communications link 28, and such calls may bypass the queues for calls received by the ACD 20 on the first communications link 26. Accordingly, the customer need not wait excessively to be connected to an agent on a return call from the ACD 20.

If the customer is not available for the return call, such as if the customer's phone line is busy or otherwise inactive, for example, the ACD 20 may place repeated calls to the customer on a periodic basis such as, for example, every three minutes. According to one embodiment, the ACD 20 may only place such repeated calls to the customer during a specified time period.

Figure 3:
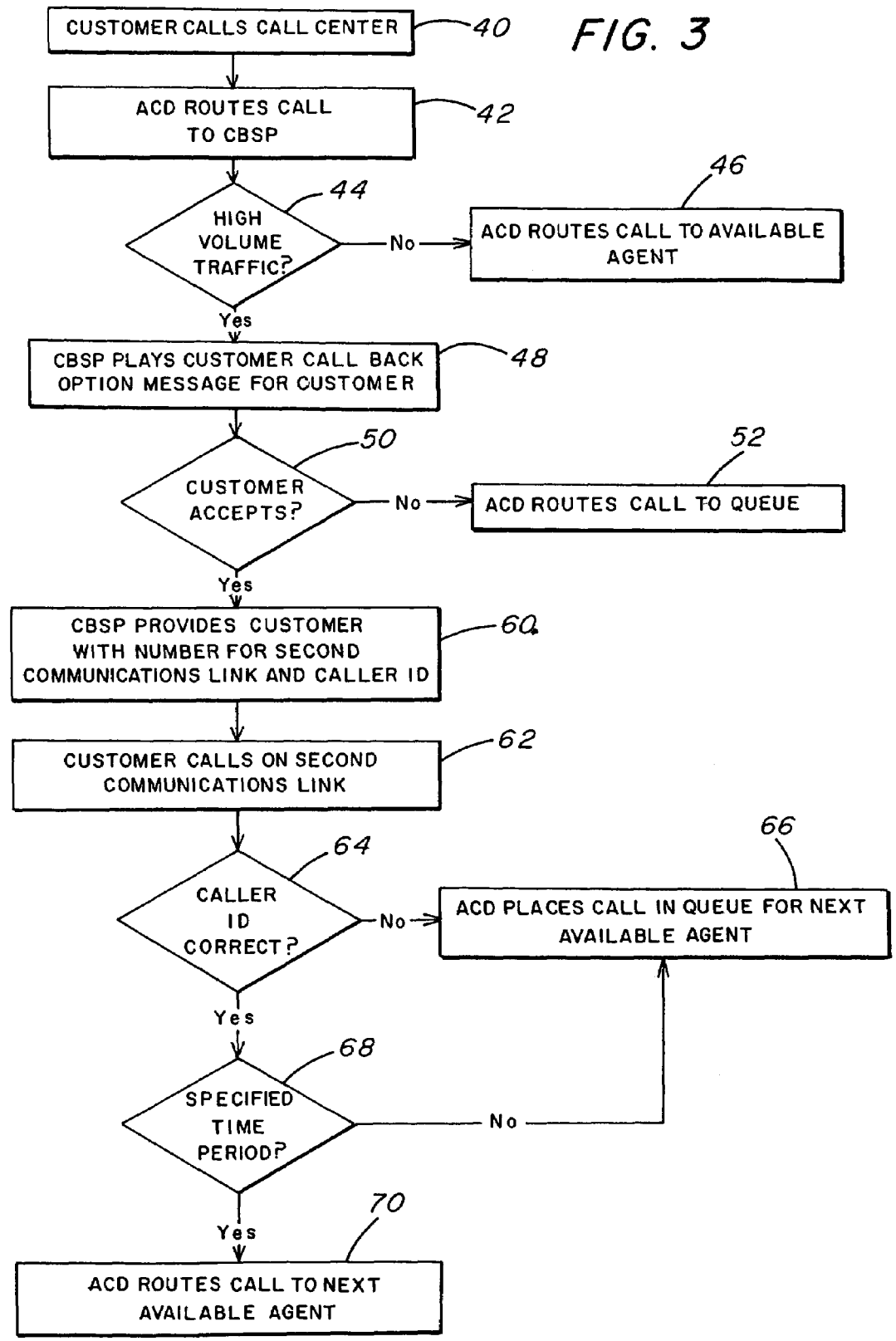
FIG. 3 is a diagram illustrating a process flow through the system of FIG. 1 according to another embodiment of the present invention.

FIG. 3 is a diagram of the process flow through the CBSP 24 for the customer call back option according to embodiment of the present invention. The process flow of FIG. 3 is similar to that of FIG. 2, except that at block 48 the incoming call processing module 30, rather than providing a call center call back option for the customer, plays a message for the customer corresponding to the customer call back option. The message may ask, for example, whether the customer wants to call back at a different time, at which time the customer's call will be processed immediately by the next available agent. For example, the incoming call processing module 30 may play a message such as: "We are currently experiencing higher than normal caller activity. If you would like to continue to wait for an operator, please press or speak 'one'. If you wish to call back later to be immediately connected to the next available agent, please press or speak 'two'."

If the customer accepts the second option at block 50, the process advances to block 60 where the incoming call processing module 30 provides the customer with the directory number and time to call the call center 12 over the second communications link 28. The incoming call processing module 30 may further play back to the customer the customer's caller identification number (ID), i.e., the directory number for the telecommunications unit on which the customer is placing the call. The caller ID may then be stored in a database for future verification.

From block 60 the process advances to block 62, where the customer subsequently calls the call center 12 using the directory number for the second communications link 28. The call is routed to the return call processing module 32 of the CBSP 24. At block 64, the return call processing module 32 determines if the customer's caller ID is correct. The return call processing module 32 may make this determination, according to one embodiment, by comparing the calling number with the caller ID stored at block 60. If the numbers do not match, the return call processing module 32 may play a message prompting the customer to enter the caller ID. Accordingly, such an embodiment permits the customer to call the call center 12 back on a different phone than the phone from which the customer placed the initial communication at block 40.

If the caller ID does not match, the process advances to block 66, where the return call processing module returns the call to the ACD 20 for routing to the appropriate call waiting queue as if the call had been received on the first communications link 26. According to other embodiments, the return call processing module 32 may provide the customer additional opportunities to enter the correct caller ID. In addition, according to other embodiments, rather than processing the call as if it where received over the first communications link if the caller ID does not match, the return call processing module 32 may advise the customer that it is dropping the call due to the incorrect caller ID.

If, however, the customer enters the correct caller ID, the process advances to block 68 where the return call processing module 32 determines if the customer has called during the specified time period. The return call processing module 32 may make this determination, according to one embodiment, by accessing a database storing the appropriate call back times for associated caller ID numbers. Entries of the database may be populated by the incoming call processing module 30 at block 60.

If the return call processing module 32 determines that the customer's return call has not been placed during the specified time period, the process may advance to block 66. On the other hand, if the return call processing module 32 determines that the customer's return call has been placed during the specified time period, the process advances to block 70, where the ACD routes the call to the next available agent, bypassing any call-waiting queues. Thus, in effect, the customer is placed at the front of the appropriate call-waiting queue.

According to another embodiment of the present invention, the system 10 may implement the return call service using the intelligent functionality of the Advanced Intelligent Network. The AIN is a network used in conjunction with a conventional telephone network, such as the public switched telephone network (PSTN), to provide enhanced voice, video and data services and dynamic routing capabilities using two different networks. The actual voice call is transmitted over a circuit-switched network, but the signaling is done on a separate packet-switched network. Before describing details of the system of the present invention, a description of the AIN is provided.

Figure 4:
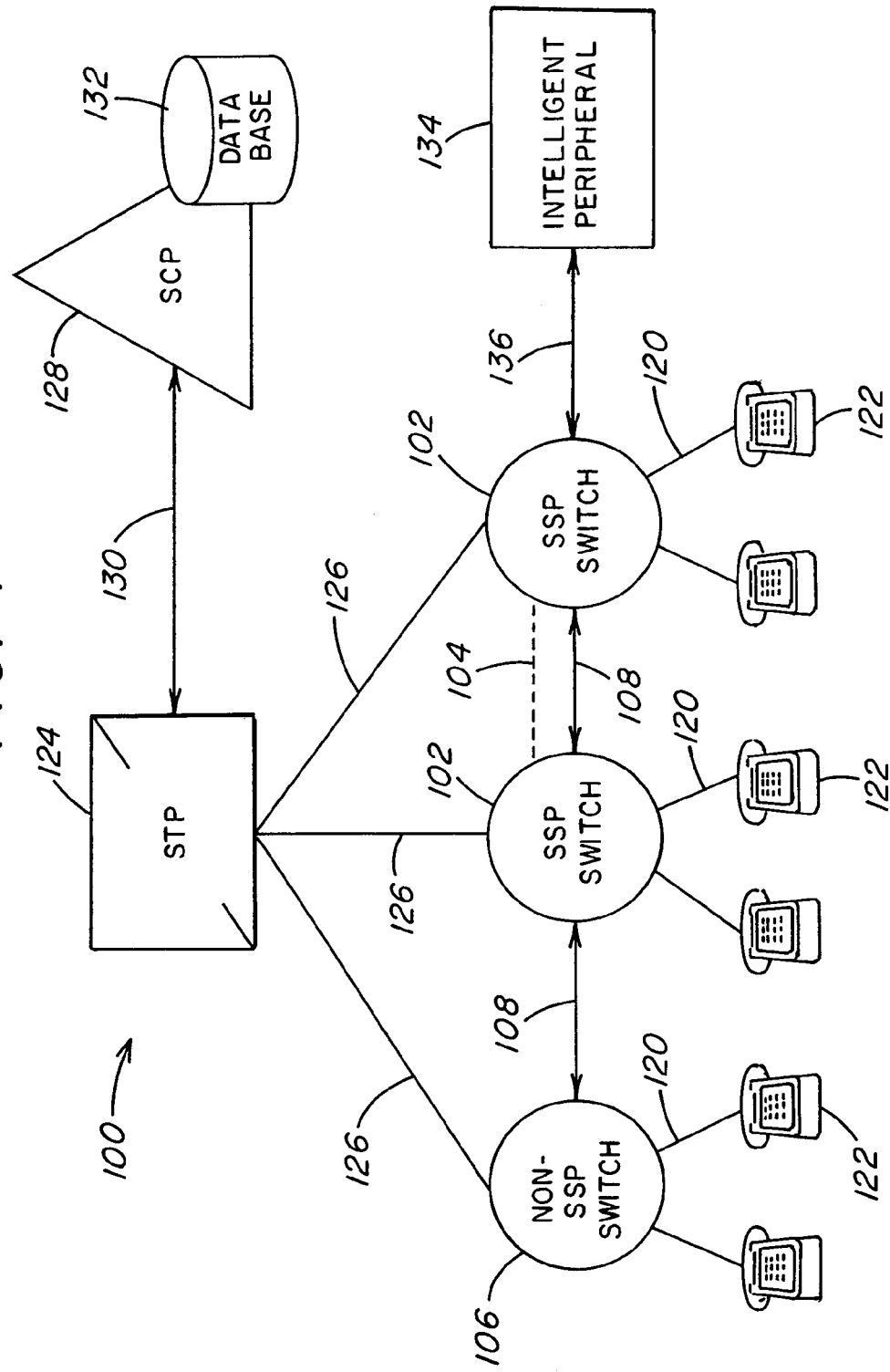
FIG. 4 is a diagram of an Advanced Intelligent Network (AIN) for integration with a public switched telephone network.

FIG. 4 is a block diagram of an Advanced Intelligent Network (AIN) 100 for integration with the public switched telephone network (PSTN). The AIN 100 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 100 as illustrated in FIG. 4, the central office switches may be provided as Service Switching Points (SSP) switches 102. The dashed line 104 between the SSP switches 102 indicates that the number of SSP switches 102 in the AIN 100 may vary depending on the particular requirements of the AIN 100. The AIN 100 may also include a non-SSP switch 106. The difference between the SSP switches 102 and the non-SSP switch 106 is that the SSP switches 102 provide intelligent network functionality. Interconnecting the SSP switches 102 and the non-SSP switch 106 are communication links 108 which may be, for example, trunk circuits.

Each SSP switch 102 and non-SSP switch 106 has a number of subscriber lines 120 connected thereto. The subscriber lines 120 may be, for example, conventional twisted pair loop circuits connected between the switches 102, 106 and the telephone drops for the customer premises, or the subscriber lines 120 may be trunk circuits, such as T-1 trunk circuits. Typically, the number of subscriber lines 120 connected to each switch 102, 106 is on the order of ten thousand to one hundred thousand lines. Each of the subscriber lines 120 is connected to a terminating piece of customer premises equipment, represented in FIG. 4 by the landline telephones 122. Alternatively, the terminating equipment may be other types of telecommunications units such as, for example, a telecopier, a personal computer, a modem, or a private branch exchange (PBX) switching system.

For the AIN 100 illustrated in FIG. 4, each SSP switch 102 and the non-SSP switch 106 is connected to a signal transfer point (STP) 124 via a communication link 126. The communication link 126 may employ, for example, the SS7 switching protocol. The STP 124 may be a multi-port high speed packet switch that is programmed to respond to the routing information in the appropriate layer of the switching protocol, and route the data packets to their intended destination.

One of the intended destinations of the data packets from the STP 124 is a service control point (SCP) 128. The STP 124 is in communication with the SCP 128 via a communication link 130, which may also employ the SS7 switching protocol. The SCP 128 may be an intelligent database server such as, for example, an Intelligent Network Service Control Point available from Lucent Technologies Inc., Murray Hill, N.J., and may have associated with it a network database 132 for storing network data. The intelligent functionality of the SCP 128 may be realized by application programs, such as programmable Service Program Applications (SPA), which are run by the SCP 128. The SCP 128 is normally employed to implement high volume routing services, such as call forwarding and local number portability. The SCP 128 may also be used for maintenance of and providing access to the network databases for authorization of billing, such as credit card validations. In addition, another of the functions of the SCP 128 is maintenance of the network database 132, which may store subscriber information, such as subscriber call management profiles, used in providing enhanced calling services.

The AIN 100 illustrated in FIG. 4 also includes an intelligent peripheral (IP) 134. The IP 134 may be, for example, a services node such as a Compact Services Node (CSN) available from Lucent Technologies Inc., Murray Hill, N.J., although the IP 134 may be any other type of available AIN-compliant IP. The IP 134 may be connected to one or more of the SSP switches 102 via a communications link 136 which may be, for example, an Integrated Service Digital Network (ISDN), including BRI (Basic Rate Interface) or PRI (Primary Rate Interface) lines. According to other embodiments, the communications link 136 may be, for example, a T-1 trunk circuit.

The IP 134 may be used primarily when some enhanced feature or service is needed that requires an audio connection to the call such as, for example, the audio calling name service, or when transfer of a significant amount of data to a subscriber over a switched connection during or following a call is required. Similar to the SCP 128, the intelligent functionality of the IP 134 may be realized by programmable applications executable by the IP 134.

In order to keep the processing of data and calls as simple as possible at the switches, such as at the SSP switches 102, a set of triggers may be defined at the SSP switches 102 for each call. A trigger in an AIN is an event associated with a particular subscriber line 120 that generates a data packet to be sent from the SSP switch 102 servicing the particular subscriber line 120 to the SCP 128 via the STP 124. The triggers may be originating triggers for calls originating from the subscriber premises or terminating triggers for calls terminating at the subscriber premises. A trigger causes a message in the form of a query to be sent from the SSP switch 102 to the SCP 128.

The SCP 128 in turn interrogates the database 132 to determine whether some customized call feature or enhanced service should be implemented for the particular call, or whether conventional dial-up telephone service should be provided. The results of the database inquiry are sent back from the SCP 128 to the SSP switch 102 via the STP 124. The return packet includes instructions to the SSP switch 102 as to how to process the call. The instructions may be to take some special action as a result of a customized calling service or enhanced feature. For example, for an enhanced calling feature requiring the capabilities of the IP 134, the return message from the SCP 128 may include instructions for the SSP switch 102 to route the call to the IP 134. In addition, the return message from the SCP 128 may simply be an indication that there is no entry in the database 132 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 100 illustrated in FIG. 4 includes only one STP 124, one SCP 128, one network database 132, and one IP 134, although the AIN 100 may further include an additional number of these components as well as other network components, which are not included in FIG. 4 for purposes of clarity. For example, the AIN 100 may additionally include redundant STPs and SCPs to take over if the STP 124 or the SCP 128 should fail. In addition, the AIN 100 may include an Automatic Electronic Switching System (AESS) Network Access Point (NAP) in communication with the STP 124, which may be programmed to detect the trigger conditions. Further, the AIN 100 may include regional STPs and regional SCPs in communication with, for example, the local STP 124, for routing and servicing calls between different LECs.

Figure 5:
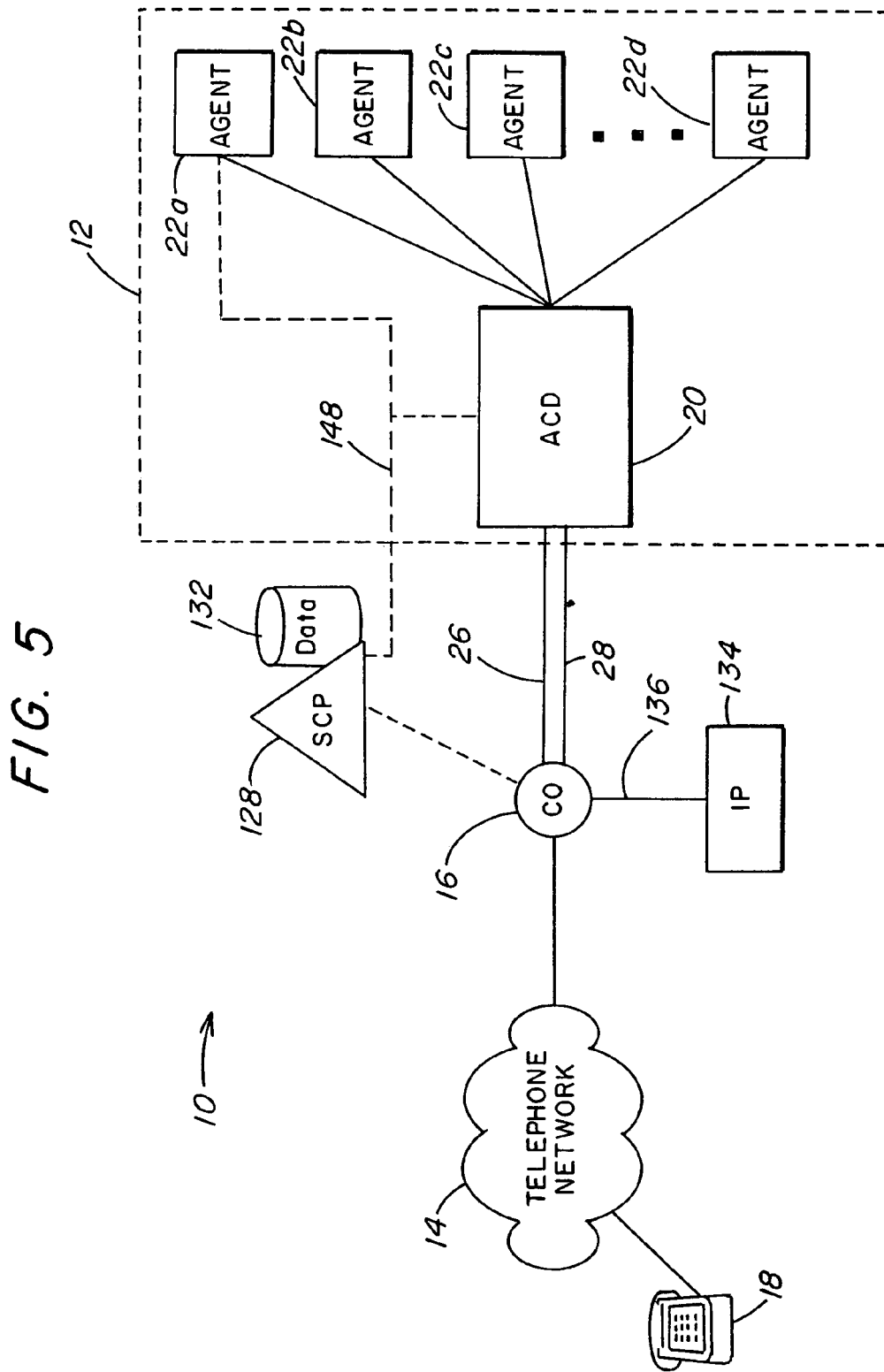
FIG. 5 is a diagram of the system according to another embodiment of the present invention.

FIG. 5 is a diagram of the system 10 according to an embodiment of the present invention employing the intelligent functionality of the AIN. The system 10 is similar to that of FIG. 1, except that it includes the SCP 128 and the IP 134 in communication with the CO SSP switch 16 (designated as "CO" in FIG. 5 and referred to as "CO switch(es)" hereinafter). For purposes of clarity, other elements of the AIN 100 of FIG. 4 are not shown in FIG. 5.

Figure 6:
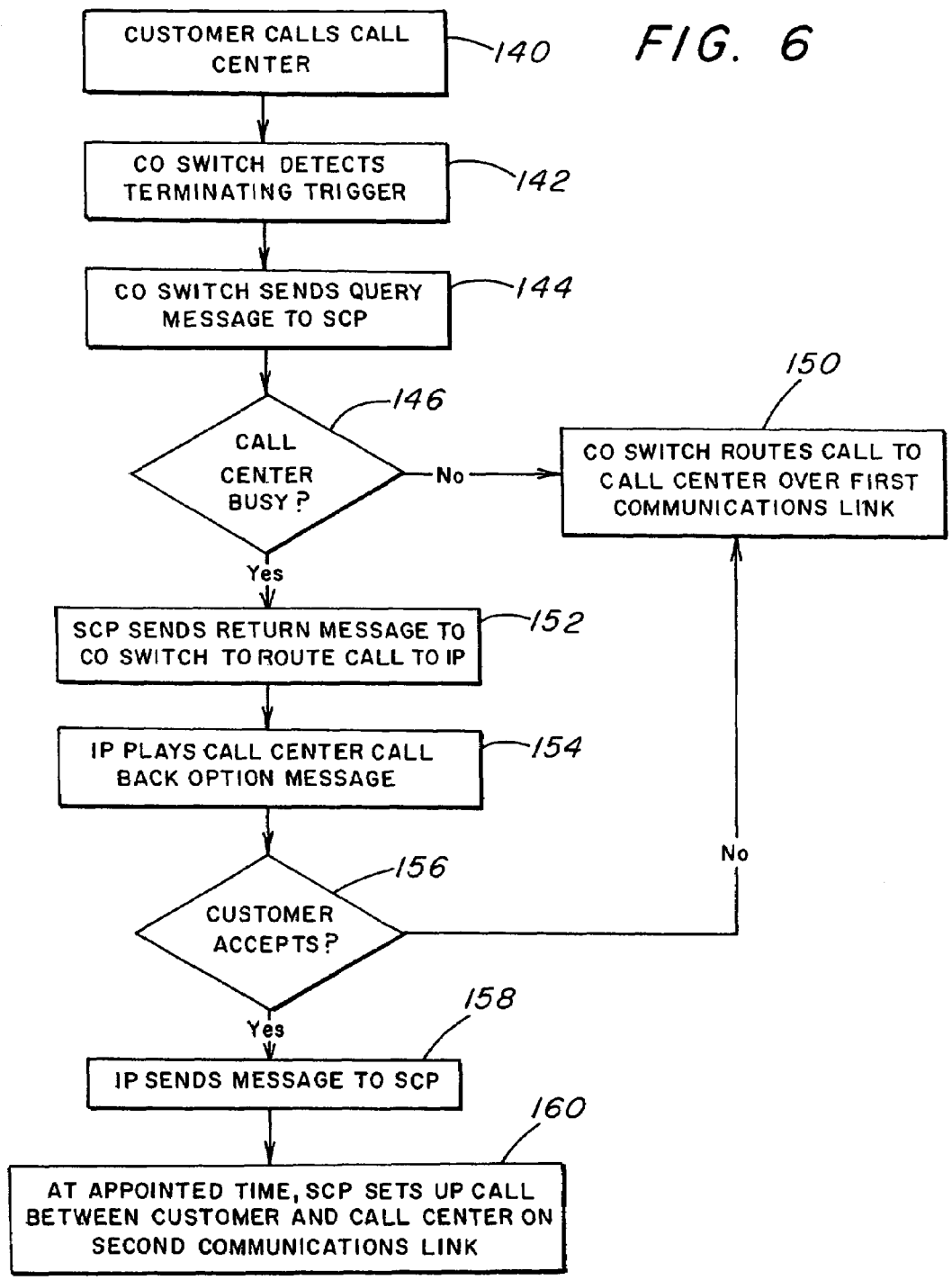
FIG. 6 is a diagram of the process flow through the system of FIG. 5 according to one embodiment of the present invention.

FIG. 6 is a block diagram of the process flow through the system 10 of FIG. 5 for implementing the call center call back option with the AIN according to one embodiment of the present invention. The process initiates at block 140 where the customer places a call to the call center 12. From block 140 the process advances to block 142 where the CO switch 16, having been provisioned with a terminating trigger for calls to the call center 12, detects the incoming call and, at block 144, sends a query message to the SCP 128.

From block 144 the process advances to block 146 where the SCP 128 determines if the call center 12 is experiencing high volume traffic. According to one embodiment, similar to the process described hereinbefore with respect to FIG. 3, the SCP 128 may make this determination by consulting traffic pattern data in the database 132. For example, the database 132 may specify that the call center 12 experiences heavy volume traffic between 8 am and 5 pm, Monday through Friday. Thus, for calls received during these time periods, the SCP 128 may determine that the call center 12 is experiencing high volume traffic. According to another embodiment, the SCP 128 may be updated with current call center volume data via a communications link 148 between, for example, the ACD 20 or one of the agent terminals 22*a–n* and the SCP 128. According to one embodiment, the communications link 148 may employ the TCP/IP suite of communication protocols. Consequently, a system administrator may have a web-interface with the SCP 128 to provide real-time status information regarding the call volume at the call center 12.

If at block 146 the SCP 128 determines that the call center 12 is not experiencing high volume traffic, the process advances to block 150 where the SCP 128 may send a return message to the CO switch 16 to route the call to the call center 12 over the first communications link 26. Conversely, if the SCP determines that the call center 12 is experiencing high volume traffic, the process advances to block 152 where SCP 128 may send a return message to the CO switch 16 to route the call to the IP 134.

From block 152 the process advances to block 154 where the IP 134 plays a message for the customer corresponding to the call center call back option. For example, the IP 134 may play a message such as: "We are currently experiencing higher than normal caller activity. If you would like to continue to wait for an operator, please press or speak 'one'. If you would like for us to call you back between [a specified time period], please press or speak 'two'." The message may consist of components of recorded voice files stored on the IP 134. According to another embodiment, the IP 134 may play the message utilizing a TTS (text-to-speech) software package.

From block 154 the process advances to block 156 where the IP 134 determines whether the customer accepts the call back option. The IP 134 may ascertain the customer's response to the message using a DTMF decoder or an ASR module. If the customer does not accept the option, the process returns to block 150, where the IP 134 returns the call to the CO switch 16 for routing to the call center over the first communications link 26.

Conversely, if the customer accepts the call-back option at block 156, the process advances to block 158 where the IP 134 sends a message of that effect to the SCP 128. From block 158 the process advances to block 160 where, at the appointed time, the SCP 128 sets up a call between the customer and the call center 12 over the second communications link 28. As discussed previously, calls to the call center 12 over the second communications link 28 may bypass the queues for calls received by the call center 12 on the first communications link 26. Accordingly, the customer need not wait excessively to be connected to an agent on the return call. If the customer is not available for the return call, such as if the customer's phone line is busy not answered, for example, the SCP 128 may place repeated calls to the customer on a periodic basis such as, for example, every three minutes. According to one embodiment, the SCP 128 may only place such repeated calls to the customer during a specified time period.

Figure 7:
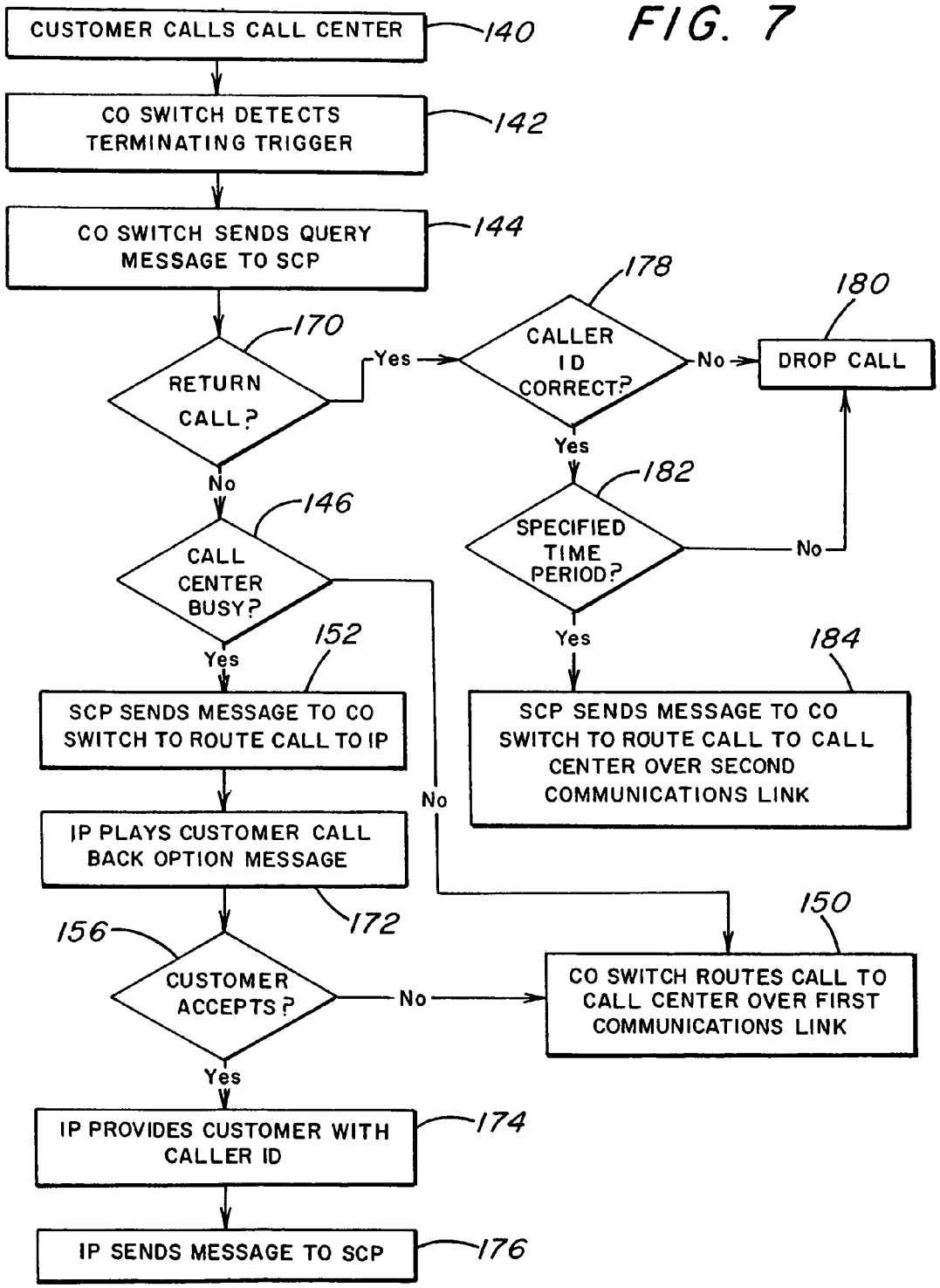
FIG. 7 is a diagram of the process flow through the system of FIG. 5 according to another embodiment of the present invention.

FIG. 7 is a diagram of the process flow through the system 10 of FIG. 5 for implementing the customer call back option with the AIN according to one embodiment of the present invention. The process initiates at block 140 where the customer places a call to the call center 12. From block 140 the process advances to block 142 where the CO switch 16, having been provisioned with a terminating trigger for calls to the call center 12, detects the incoming call and, at block 144, sends a query message to the SCP 128.

From block 144 the process advances to block 170 where the SCP 128 determines if the call from the customer is a return call. This determination may be made, according to one embodiment, by playing a message for the customer asking if the customer is returning a call to the call center 12 pursuant to the customer call return option. The message may be played and the customer's response may be detected using the IP 134, as described previously. According to one embodiment, the caller's number may be check against the number stored in the database to determine whether the call is a return call.

If the call is not a return call from the customer, the process advances to block 146 where the SCP 128 determines if the call center 12 is busy, as previously discussed.

If the call center is not busy, the process advances to block 150 where the SCP 128 sends a return message to the CO switch 16 to route the call to the call center 12 over the first communications link 24. On the other hand, if the SCP 128 determines that the call center is busy, the process advances to block 152 where the SCP 128 sends a return message to the CO switch 16 to route the call to the IP 134.

From block 152 the process advances to block 172 where the IP 134 plays a message corresponding to the customer call back option. The message may ask, for example, whether the customer wants to call back at a different time, at which time the call will be processed immediately by the next available agent. For example, the incoming call processing module 30 may play a message such as: "We are currently experiencing higher than normal caller activity. If you would like to continue to wait for an operator, please press or speak 'one'. If you wish to call back later to be immediately connected to the next available agent, please press or speak 'two'."

From block 172 the process advances to block 156 where the IP 134 determines if the customer accepts the customer call back option. As discussed previously, the IP 134 may make this determination using a DTMF decoder or an ASR module. If the customer does not accept, the process advances to block 150, where the CO switch 16 routes the call to the call center 12 over the first communications link 26.

Alternatively, if the customer accepts the customer call back option at block 156, the process advances to block 174 where the IP 134 may play back the customer's caller identification number (ID), i.e., the directory number for the telecommunications unit on which the customer is placing the call. The caller ID may be stored in a database for future verification. In addition, the IP 134 may also tell the customer the time at which the customer may call back to receive the promised fast response. From block 174 the process advances to block 176 where the IP 134 sends a message to the SCP 128 with information regarding the customer's acceptance of the customer call back option and the customer's caller ID.

Returning to block 170, if it is determined that the customer is making a return call, the process advances to block 178 where the SCP 128 determines if the customer's caller ID is correct. According to one embodiment, the SCP 128 may make this determination by comparing the calling number with the caller ID provided to the customer at block 174. If the numbers do not match, the SCP 128, in conjunction with the IP 134, may play a message prompting the customer to enter the caller ID. Accordingly, such an embodiment permits the customer to call the call center 12 back on a different phone than the phone from which the customer placed the initial communication at block 140.

If the caller ID is not correct, the process advances to block 180 where the SCP 128 may drop the call. According to another embodiment, the AIN 10 may allow the customer additional opportunities to correctly enter the caller ID. According to another embodiment, the SCP 128 may send a message to the CO switch 16 to route the call to the call center 12 over the first communications link 26.

Conversely, if the caller ID is correct, the process advances to block 182 where the SCP 128 determines if the customer has called back within the specified time period. The SCP 128 may make this determination, according to one embodiment, by accessing the database 132, which may store the appropriate call back times for associated caller ID numbers. If the SCP 128 determines that the customer's return call has not been placed during the specified time period, the process may advance to block 180. On the other hand, if the SCP 128 determines that the customer's return call has been placed during the specified time period, the process advances to block 184 where the SCP 128 may send a message to the CO switch 12 to route the call to the call center 12 over the second communications link 28, thereby effectively bypassing callers waiting in queues associated with the first communications link 26.

Although the present invention has been described herein with respect to certain embodiments, those of ordinary skill in the art will recognize that many modifications and variations of the present invention may be implemented. For example, certain of the steps described in conjunction with the process flows of FIGS. 2, 3, 6 and 7 may be performed according to alternative sequences. The foregoing description and the following claims are intended to cover all such modifications and variations.

What is claimed is:

1. A device for providing a call center call back option, comprising:
    at least one communications port that receives calls directed to the call center; and
    a processing device that is linked to the communications port and that provides a call back option for a first call that is received, where the call back option is to call the call center back during a specified time period and wherein the processing device establishes a second call during the specified time period based on an acceptance of the call back option provided to the first call by receiving the second call, wherein further the processing device determines the specified time by searching a database that tracks call volume for a time with low call volume and wherein further still, the processing device allows the second call to bypass at least one call waiting queue associated with the call center such that the second call is given priority greater than at least one pending call associated with the call center.

2. The device of claim 1, wherein the processing device determines a caller ID of the second call and allows the second call to bypass the at least one waiting queue if the caller ID matches a caller ID associated with the first call.

3. The device of claim 1, wherein the processing device determines whether the second call is received during the specified time and allows the second call to bypass the at least one waiting queue if the second is received during the specified time.

4. The device of claim 1, wherein the second call bypasses at least one caller queue into which the caller would otherwise have been placed such that the second call is always connected to the first available representative.

5. The device of claim 1, wherein the processing device provides the call back option by providing a voice prompt.

6. The device of claim 1, wherein the processing device receives at least one of dual tone multi-frequency input or automatic speech recognition input to accept the call back option.

7. The device of claim 1, wherein the specified time is a time interval.

8. A device for providing a call center call back option, comprising:
    at least one communications port that receives calls directed to the call center; and
    a processing device that is linked to the communications port and that provides a plurality of call back options for a first call that is received via a first communications link, where a first call back option is being called back by the call center during a specified time period and where a second call back option is calling the call center a second time during a specified time period, wherein the processing device establishes a second call via a second communications link during the specified time period based on an acceptance of the call back option provided to the first call by initiating the second call to a source of the first call when the first call back option is selected and by receiving the second call from the source of the first call when the second call back option is selected, wherein further the processing device finds the specified time period by searching a database that tracks call volume for a time with low call volume.

9. The device of claim 8, wherein the second call bypasses at least one caller queue into which the caller would otherwise have been placed such that the second call is always connected to the first available representative.

10. The device of claim 8, wherein the processing device provides the call back option by providing a voice prompt.

11. The device of claim 8, wherein the processing device receives at least one of dual tone multi-frequency input or automatic speech recognition input to accept the call back option.

12. The device of claim 8, wherein the specified time is a timer interval.

13. A method for providing a call center call back option, comprising:
    receiving a first call directed to the call center;
    providing a call back option for the first call that is received, where the call back option is to call the call center a second time during a specified time period; and
    establishing a second call during the specified time period based on an acceptance of the call back option provided to the first call by receiving the second call from the source of the first call, wherein the second call bypasses at least one caller queue into which the caller would otherwise have been placed such that the second call is always connected to the first available representative.

14. The method of claim 13, wherein the specified time is found by searching a database that tracks call volume for a time with low call volume.

15. The method of claim 13, wherein providing a call back option comprises providing a voice prompt.

16. The method of claim 13, further comprising receiving at least one of dual tone multi-frequency input or automatic speech recognition input to accept the call back option.

17. The method of claim 13, further comprising repeatedly placing the second call.

* * * * *